United States Patent [19]

Lamond et al.

[11] 4,241,001
[45] * Dec. 23, 1980

[54] PROCESS FOR PRODUCING PELLETIZED PIGMENTARY MATERIALS

[75] Inventors: Trevor G. Lamond; Charles R. Cuthbertson, both of Borger, Tex.

[73] Assignee: J. M. Huber Corporation, Locust, N.J.

[*] Notice: The portion of the term of this patent subsequent to Jun. 26, 1996, has been disclaimed.

[21] Appl. No.: 51,092

[22] Filed: Jun. 22, 1979

[51] Int. Cl.³ .............................................. B01J 2/12
[52] U.S. Cl. .................................................. 264/117
[58] Field of Search ................................ 264/117, 115

[56] References Cited

U.S. PATENT DOCUMENTS

| | | | |
|---|---|---|---|
| 3,277,218 | 10/1966 | Dollinger | 264/117 |
| 3,406,426 | 10/1968 | Probst, Jr. et al. | 264/117 |
| 3,528,785 | 9/1970 | Dingus | 264/117 |
| 4,159,296 | 6/1979 | Florea et al. | 264/117 |

*Primary Examiner*—Donald E. Czaja
*Assistant Examiner*—James R. Hall
*Attorney, Agent, or Firm*—Ernest A. Schaal; Harold H. Flanders

[57] ABSTRACT

A process for making densified pellets of pigmentary materials such as kaolin clay and talc of high bulk density, good handling and bulk flow properties, and low moisture content is disclosed. The process consists essentially of mixing substantially dry pigmentary material with water to bring the total moisture content of the finely divided pigmentary material to from about 17% to about 26% by weight based on the weight of said dry pigmentary material during mixing in a pin mixer, followed by screening, and subsequent pelletization in a roller while drying. The pellets are dryed to 1% or less moisture content by weight based on the weight of dry pigmentary material.

1 Claim, 1 Drawing Figure

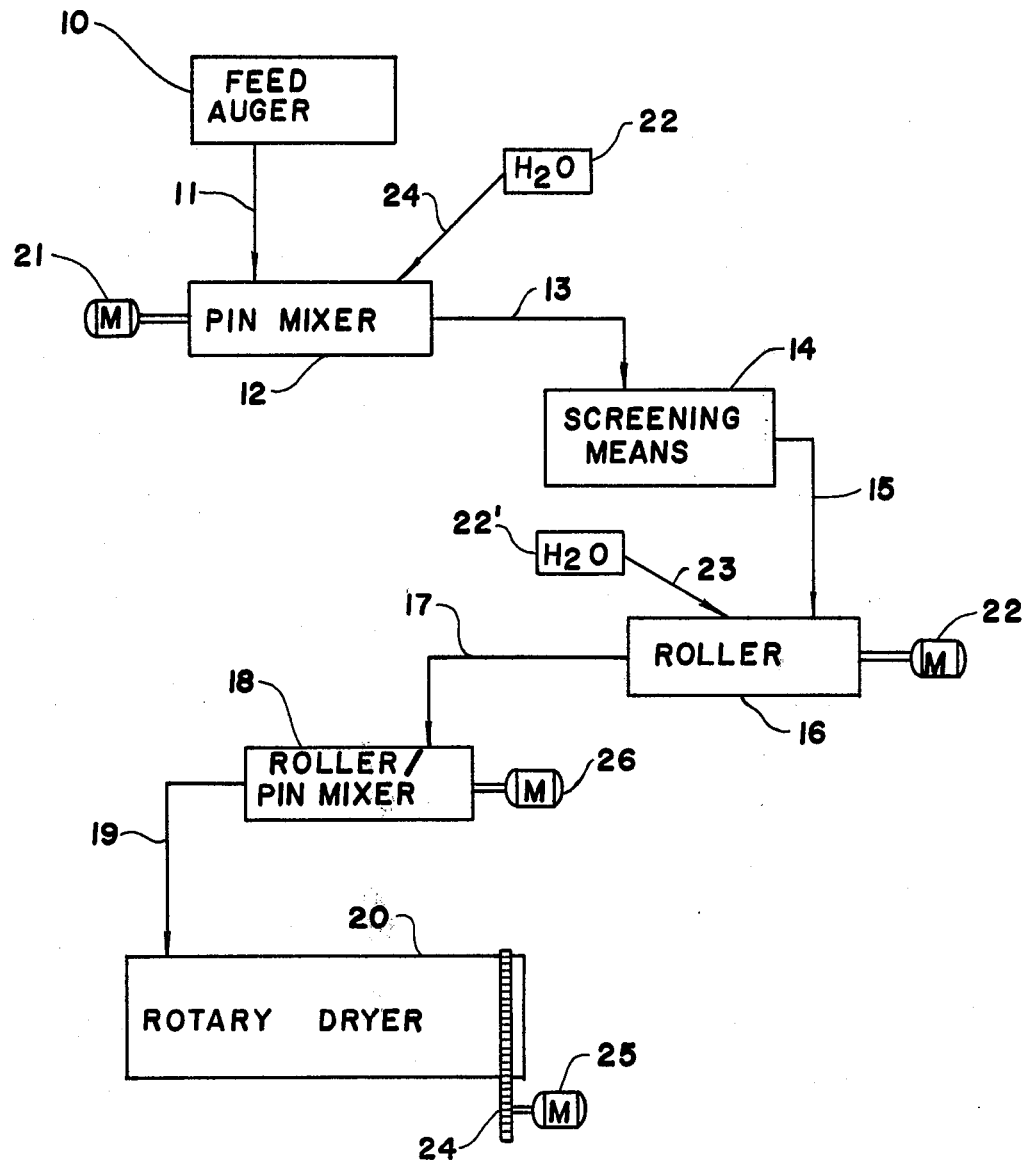

PROCESS FOR PRODUCING PELLETIZED PIGMENTARY MATERIALS

BACKGROUND OF THE INVENTION

In general, the present invention relates to the pelletization of fine pigmentary materials such as keolin clays and talcs.

The prior art has repeatedly addressed the problem of producing such pellets of suitable hardness and durability with high bulk density, good handling and bulk flow properties and low moisture content. Heretofore, the results obtained have not been entirely satisfactory.

SUMMARY OF THE INVENTION

Accordingly, it is an object of this invention to provide a new, highly effective method which overcomes the deficiencies of the prior art.

It is a further object of the present invention to provide a new process for densifying kaolin clay and talc.

Another object of the present invention is to produce kaolin clay and talc pellets of high bulk density.

Still another object of the present invention is to produce kaolin clay and talc pellets having good handling and bulk flow properties.

Another object of the present invention is to produce better kaolin clay and talc pellets.

An additional object of the present invention is to produce a pellet size distribution in a desirable, narrow range.

A further object of the present invention is to produce hard, durable pellets of kaolin clay and talc having a low moisture content.

Other objects and a further understanding of the present invention may be had by referring to the following description and claims taken in conjunction with the accompanying drawing.

The present invention overcomes the deficiencies of the prior art and achieves its objectives by mixing substantially dry, finely divided, pigmentary material in a pin mixer with an added quantity of water supplied in the form of a fine spray in an amount sufficient to bring the total moisture content of the finely divided, pigmentary material to from about 17% to about 26% by weight based on the weight of dry pigmentary material. After such mixing in a pin mixer, the pigmentary material is screened. Following screening, the kaolin clay is further pelletized in a roller and dried to 1% or less moisture content on a weight basis based on the weight of dry pigmentary material.

BRIEF DESCRIPTION OF THE DRAWING

In order to facilitate the understanding of the present invention, reference will now be made to the appended drawing of a preferred embodiment of the present invention. The drawing should not be construed as limiting the invention, but is exemplary only. The drawing is a block schematic diagram of the process of the preferred embodiment of the present invention.

DESCRIPTION OF THE PREFERRED EMBODIMENTS

A preferred embodiment of the present invention is shown in the appended drawing. A substantially constant supply of substantially dry kaolin clay or talc is passed by feed auger 10 into pin mixer 12 by line 11. The substantially dry kaolin clay or talc is mixed in pin mixer 12 with water which is added by a spray 24 in the form of a fine spray or mist. Water is supplied to spray 24 from a suitable supply source 22. Spray 24 serves to provide a fine spray or mist of water directly into and within the working chamber of pin mixer 12 where the kaolin clay or talc is being worked and mixed. Pin mixer 12 is operated in a conventional manner by a motor 21.

The wetted kaolin clay or talc is then passed from pin mixer 12 by line 13 into screening means 14 where it is worked and forced through a 10-mesh screen.

Following screening in screening means 14, the kaolin clay or talc is then passed by line 15 to roller 16 where it is further pelletized. Pin mixer 16 is operated in a conventional manner by motor 22.

The pellets formed in roller 16 may then be passed by line 17 to a second roller or pin mixer 18 for further pelletisation and polishing. The second roller or pin mixer 18 is operated in a conventional manner by motor 26.

In normal operation, sufficient water for the process is added to pin mixer 12 to wet the clay. However, in optional embodiments, additional water may be added to roller 16 via line 23 if necessary from source 22'.

It will be understood that second roller or pin mixer 18 is an optional embodiment in further pelletizing and polishing the pellets.

Upon passing from roller or pin mixer 18, the pellets of kaolin clay or talc are then passed by line 19 into a rotary dryer 20 which drys the pellets to a moisture content of 1% or less by weight based on the weight of the dry clay or talc to provide the final product which upon passing from rotary dryer 20 may be conveyed to storage or to shipping. Operation of the rotary dryer is effected by gear means 24 driven by motor 25.

While water is referred to throughout as the preferred embodiment of the wetting agent, other suitable liquids or fluids may be used alone or in conjunction with water. Other such typical wetting agents include steam, a water-oil emulsion, a water-based solution of a molasses-type binder, organic or oleaginous liquids and combinations of the same with each other and with water. The water may be at ambient temperature or heated.

The amount of water added in pin mixer 12 is an amount sufficient to bring the total moisture content of the kaolin clay or talc to from about 17% to about 26%, preferably from about 21% to about 25%, more preferably from about 22.5% to about 25%, and most preferably about 23%, all percentages by weight based on the weight of the dry kaolin clay or talc.

While any suitable pin mixers may be employed, pin mixers such as described in U.S. Pat. No. 3,528,785 are preferred.

Pin mixer 12 is 14 feet long, has a 13 inch width, a 6 inch pitch, and ⅝ inch pin diameter. With a 7.5 horsepower motor, pin mixer 12 may be operated from 80 to 150 revolutions per minute. Typically 80 revolutions per minute are preferred.

Screening means 14 may be a No. 4 "Mikro-Pulverizer" manufactured by MikroPul Corporation which may be operated at 1090 revolutions per minute and at 6163 feet per minute tip speed with a 30 horsepower motor. Alternatively screening means 14 may be a No. 2 SCB Model manufactured by Pulverizing Machinery Company also driven with a 30 horsepower motor. In many cases the screening means 14 may consist of a 10-mesh screen with suitable conventional means provided to force the wet pellets through the 10-mesh screen.

Roller 16 is 10 feet long, 13 inches wide, and may include mixing elements with a 9 inch pitch and a ½ inch pin diameter. With a 5 horsepower motor, roller 16 may be operated from 80 to 150 revolutions per minute, with 116 revolutions per minute preferred. The roller 16 may if desired be heated to begin slow drying of the pellets.

Rotary dryer 20 is a direct fired rotary dryer manufactured by the Hardinge Company. Rotary dryer 20 is 45 feet long with a 6 foot diameter. Rotary dryer 20 is operated at 2 revolutions per minute and has a 3 inch lift on a 45° angle in the last 25 feet of its 45 foot length.

Conventional feed augers, screw augers, conveying belts and the like are employed in passing the kaoling clay or talc to and from each of the elements of equipment recited above in the process of the present invention.

Spray nozzle 24 may be a Beta Fog Nozzle which atomizes the water to spray a fine mist or fog of water to the kaolin clay or talc.

To further facilitate the understanding of the present invention, reference will not be made to the following examples which should not be construed as limiting the invention but are exemplary only.

CONTROL EXAMPLE I

As a control for comparison, kaolin clay was pelletized in a pin mixer corresponding to pin mixer 18 operated at 190 revolutions per minute with the addition of 23% water. The pellets produced had the following pellet size distribution:

| >5 mesh | 58.4% |
| --- | --- |
| 10 mesh | 35.2% |
| 20 mesh | 5.1% |
| 40 mesh | 0.4% |
| 60 mesh | 0.4% |
| 100 mesh | 0.2% |
| Pan | 0.3% |

CONTROL EXAMPLE II

As a further comparative control, 5% water by weight was added to kaolin clay in a pin mixer operated at 190 revolutions per minute by means of a Beta Fog Nozzle. The clay was then micropulverized and passed to a pin mixer operated at 190 revolutions per minute. Additional water in the amount of 18% was added in this second pin mixing operation to form pellets having the following distribution:

| >5 mesh | 60.4% |
| --- | --- |
| 10 mesh | 30.2% |
| 20 mesh | 8.1% |
| 40 mesh | 0.8% |
| 60 mesh | 0.2% |
| 100 mesh | 0.2% |
| Pan | 0.3% |

The pellets of this example were observed to be non-uniform and no better in quality than those produced by pin mixing alone.

EXAMPLE III

Kaolin clay was mixed in a pin mixer with 23% water by weight based on the weight of the dry clay and passed through a micropulverizer. The kaolin clay was then pelletized in a pin mixer operated at 190 revolutions per minute to yield the following pellet size distribution:

| >5 mesh | 0.80% |
| --- | --- |
| 10 mesh | 2.75% |
| 20 mesh | 28.90% |
| 40 mesh | 36.79% |
| 60 mesh | 19.00% |
| 100 mesh | 8.50% |
| Pan | 3.26% |

EXAMPLE IV

Kaolin clay was mixed in a pin mixer with 23% water by weight based on the weight of the dry clay and passed through a micropulverizer. The kaolin clay was then pelletized in a pin mixer operated at 190 revolutions per minute for 1 minute. The pellets were then dried to 1% moisture by weight. The pellets had the following screen analysis:

| >5 mesh | 2% |
| --- | --- |
| 10 mesh | 3% |
| 20 mesh | 18% |
| 40 mesh | 31% |
| 60 mesh | 20% |
| 100 mesh | 13% |
| Pan | 13% |

The pellets were observed to have the desired degree of hardness and good flow and bulk handling characteristics. The pellet hardness of the pelletized kaolin clay was found to be from about 60 grams to about 110 grams. The bulk density of the pelletized kaolin clay was found to be from about 57 pounds per cubic foot to about 63 pounds per cubic foot as compared to a bulk density for pulverized kaolin clay of from 40 to 45 pounds per cubic foot. The rubber dispersion in synthetic rubber of the pelletized kaolin clay was found to be from about 89% dispersion to 99% dispersion as compared to 88% dispersion for a typical pulverized clay.

EXAMPLE V

A mixture of 90% Nucap modified kaolin clay and 10% Mistron Vapor talc was mixed in a pin mixer with 21% water by weight based on the weight of the dry clay and talc. Nucap modified kaolin clay is a kaolin clay surface modified with mercaptosilane. Mistron Vapor is a fine pigment grade talc, $3MgO.4SiO_2.H_2O$. Following rough formation of the pellets, they were forced through a 10-mesh screen and the resultant pellets were placed in a roller and dried. The pellet properties are shown in Table I.

EXAMPLE VI

A mixture of 80% Nucap modified kaolin clay and 20% Mistron Vapor talc was mixed in a pin mixer with 21% water by weight based on the weight of the dry clay and talc. Following rough formation of the pellets, they were forced through a 10-mesh screen and the resultant pellets placed in a roller and dried. The pellet properties are shown in Table I.

EXAMPLE VII

Mistron Vapor talc was formed into rough pellets in a pin mixer with 21% water by weight based on the weight of the dry talc. The rough pellets were forced through a 10-mesh screen and the resulting pellets placed in a roller and dried. The pellet properties are shown in Table I.

EXAMPLE VIII

Nucap modified kaolin clay was formed into rough pellets in a pin mixer with 21% water by weight of the dry surface modified clay. The rough pellets were forced through a 10-mesh screen and the resulting pellets placed in a roller and dried. The pellet properties are shown in Table I.

TABLE I

| Example No. | | V | VI | VII | VIII |
|---|---|---|---|---|---|
| Pour Density, lbs/ft$^3$ | | 52.9 | 53.3 | 46.9 | 50.6 |
| Pellet Hardness, grams | High | 110+ | 110+ | 70 | 110+ |
| | Low | 65 | 52 | 21 | 75 |
| | Avg. | 98 | 94 | 40 | 98 |
| Fines, 20 min., 120 mesh, % | | 3.6 | 2.0 | 5.6 | 1.6 |

The pellets of Example VIII were incorporated into a Natsyn 400 rubber hydrocarbon compound (RHC) having the following batch composition and by the following procedure:

| Mill Mix Batch | Parts/100 RHC |
|---|---|
| Natsyn 400 | 100.00 |
| Zinc Oxide | 5.00 |
| Stearic Acid | 2.00 |
| Clay | 75.00 |
| Sulfur | 2.75 |
| Agerite White | 1.00 |
| Amax | 1.25 |
| Methyl Tuads | 0.20 |
| Total | 187.20 |

Specific Gravity = 1.29
Batch Factor = 5.0

| Mill Batch | Grams |
|---|---|
| Natsyn 400 | 500.0 |
| Zinc Oxide | 25.0 |
| Stearic Acid | 10.0 |
| Clay | 375.0 |
| Agerite White | 5.0 |
| Total | 915.0 |

| Mill Mixing Operation and Procedure: | |
|---|---|
| Starting temperature 120° F. | |
| Minutes | Procedure |
| 0 | Band Rubber. |
| 2 | Add Stearic Acid. |
| 4 | Add Clay, Zinc Oxide and Agerite White. |
| 10 | Cut six times. |
| 13 | Remove and cool 1 hour. |

| Final Mill Batch | Grams |
|---|---|
| Masterbatch | 915.00 |
| Sulfur | 13.75 |
| Amax | 6.25 |
| Methyl Tuads | 1.00 |
| Total | 936.00 |

Add accelerator and sulfur on 120° F. mill.

The following test results were obtained:

| | 10' | 15' |
|---|---|---|
| Modulus, 293° F. Cure, psi | | |
| 100% | 460 | 430 |
| 300% | 1550 | 1460 |
| Tensile, psi @ 300% | 3960 | 3510 |
| Elongation, % | 520 | 550 |
| Hardness, Shore A$_2$ | 58 | 58 |
| Tear Resistance (Die C), psi | 235 | 220 |
| Compression Set B, 22 hrs. | | |
| 158° F., 30' @ 293° F., % | | 15.9 |
| Flexometer, 30" @ 293° F., °F. | | 143 |
| Dispersion, % | | 84 |

In general, it has been found that a large pellet requires a much heavier load to reach the crushing point than does a pellet of smaller size and that a large pellet fractures more easily upon sharp impact. The large pellets, when broken, tend to fracture into hard chunks and fines. Pellets above 10 mesh and below 60 mesh tend to cause incorporation and dispersion problems in rubber. The amount of work done on the material during pelletization is controlled by the material thruput rate, the equipment design, and the rotational speed of the pin mixers and roller. The pellet hardness may be varied within limits by controlling the time used for mixing the water with the pigmentary material and the total time of drying.

In operation, a substantially dry, finely divided kaolin clay or talc or mixtures thereof are mixed in pin mixing means while adding sufficient water to bring the total moisture content of the finely divided kaolin clay or talc to from about 17% to about 26% by weight based on the weight of the dry kaolin or talc. The kaolin clay or talc is then screened and pelletized further in roller means. The pelletized clay or talc is then dried in a rotary dryer to 1% or less moisture content by weight based on the weight of the dry clay or talc.

While the present invention has been described with reference to specific embodiments, the present application is intended to cover those various changes and substitutions which may be made by those skilled in the art without departing from the spirit and scope of the appended claims.

We claim:

1. A process for making densified pellets of kaolin clay, talc or mixtures thereof of high bulk density, good handling and bulk flow properties, and low moisture content consisting essentially of:
    (a) providing substantially dry, finely divided, pigmentary material comprising a member selected from the group consisting of kaolin clay or talc or mixtures thereof to be pelletized to be fed to pin mixing means;
    (b) feeding said substantially dry, finely divided, pigmentary material to said pin mixing means;
    (c) mixing said finely divided, pigmentary material in said pin mixing means;
    (d) adding a quantity of water in the form of a fine spray of water to the substantially dry, finely divided, pigmentary material in an amount sufficient to bring the total moisture content of the finely divided pigmentary material to from about 17% to about 26% by weight based on the weight of said dry pigmentary material during mixing in said pin mixing means and working said moistened, pigmentary material in said pin mixing means;
    (e) passing said pigmentary material from said pin mixing means on to screening means;
    (f) screening said pigmentary material in said screening means to establish the pellet size;
    (g) passing said pigmentary material from said screening means into a roller means for forming densified pellets of said screened pigmentary material and forming pellets of said screened pigmentary material therein and further pelletizing and polishing said pigmentary material in said roller means;
    (h) passing said pelletized pigmentary material from said roller means into a rotary dryer means for drying said pellets; and
    (i) drying said pellets to a moisture content of less than about 1% by weight based on the weight of said dry pigmentary material.

* * * * *